Patented Feb. 13, 1945

2,369,612

UNITED STATES PATENT OFFICE 2,369,612

METHOD FOR THE PRODUCTION OF HIGHER MOLECULAR MERCAPTALS AND MERCAPTOLS

Erik Schirm, Dessau, Anhalt, Germany; vested in the Alien Property Custodian

No Drawing. Application May 4, 1938, Serial No. 205,989. In Germany May 7, 1937

1 Claim. (Cl. 260—609).

It is known that mercaptans may be condensed with oxo-compounds i. e. with aldehydes and ketones, by means of hydrogenhalide, to mercaptals or mercaptols respectively. However, these condensation-products were hitherto made and reapplied in commercial proportions only in exceptional cases.

Now it has been found that commercially valuable higher molecular mercaptals and mercaptols respectively are obtainable for many purposes by condensing mercaptans with no less than 8 C atoms in the molecule and particularly those of the aliphatic series preferably in the presence of diluents, with oxo-compounnds viz. aldehydes, ketones and other compounds containing the carbonyl group or with the ethers ("acetals") or carboxylic acid esters of the oxo-compounds. It was surprising that, as stated within the limits of the present method, the condensation of the oxo-compounds with the higher molecular mercaptans takes an absolutely smooth course. The present procedure therefore constitutes a simple and practical method for the formation of numerous very high molecular compounds through the introduction of two higher molecular hydrocarbon residues in a single operation. The condensation takes place very rapidly between the mercaptans and the oxo-compounds. The higher molecular hydrocarbon groups are readily introduced into the molecule of the various oxo-compounds through the medium of the sulfur atoms of the mercaptans. The thus obtained mercaptals or mercaptols respectively with few exceptions are—which is remarkable—perfectly fast to the reaction of acids and alkalis.

As initial materials for the present invention we may use any aliphatic mercaptans of a straight or of a ramified chain, further any cyclo-aliphatic, aromatic, fatty-aromatic, cycloaliphatic-aromatic and cycloaliphatic-fatty-aromatic mercaptans and the like such as octyl-, dodecyl-, oleyl-, docosyl-mercaptan, as well as the 2-decahydronaphthyl-, 1- and 2-naphthyl-, 1-menaphthyl-, tetrahydro-menaphthyl-mercaptan, the 9-mercaptomethyl-octohydro-anthracene etc. all of which are lipophile groups. The carbon chain of these mercaptans may also be interrupted one or several times by heteroatoms or hetero-atom groups such as O, S, NR, CO, SO$_2$, CO.O, CO.NR SO$_2$.NR (R=H or hydrocarbon residue).

We may use as the oxo-reagent all well-known oxo-compounds, even those which contain several carbonyl groups, provided the oxo-compounds are sufficiently reactive to form mercaptols or mercaptals with the mercaptans. Mono- or poly- oxo-compounds which are suitable for the purposes of the invention, are, for example, formaldehyde and acetaldehyde in their monomeric or polymeric forms, crotonic aldehyde, glyoxal, acetone, palmitone, stearone, mesityl-oxide, acetyl-acetone, cyclo-hexanone, aceto-phenone, stearo-phenone, benzaldehyde, benzophenone, cinnamic-aldehyde and the like, as well as their ethers and esters such as methylal, ethylal, acetal, ethylidene di-acetate etc. The oxo-compounds may also contain substituents such as nitro groups, further hydrophile groups such as hydroxyl groups, substituted or non-substituted amino groups, quaternary ammonium groups, ether-, carboxyl-, sulfonyl-, sulfonic acid groups and the like or such atoms or atom groups which are easily converted into hydrophile atom groups such as halogen atoms, S, SH, —S.S—. Oxo-compounds of this kind are e. g. aldol, acetonyl-methyl alcohol, glucose, acetic acid ester, levulinic acid, benzoin, phenoxyacetone, o-benzoyl-benzoic acid, p-tolyl-acetonyl-sulfone, benzaldehyde-m-sulfonic acid, mono- and dichloroacetal, amino-acetal, chloral, monochloroacetone, ω-chloroacetophenone.

The mercaptals and mercaptoles respectively produced according to the present invention from the oxo-compounds and from the higher molecular mercaptans are of a waxlike character especially when the high-molecular cetyl-, octadecyl-, eicosyl, docosyl-, montanyl-mercaptans and the like are applied. These wax-like products may be used with good effect in industry wherever wax is now used.

Moreover the mercaptals and mercaptoles respectively are—either alone or after the introduction of hydrophile atom groups—most suitable as wetting-out-, dispersing-, lathering-, derging-, dissolving-, softening agents and the like in the detergent-, textile-, leather-, paper- and similar industries.

The nitro-substituted mercaptals and mercaptoles respectively are further apt e. g. as intermediate products for the manufacture of dyestuffs, means of combating pests and medicaments.

*Example 1*

1 part by weight of paraformaldehyde is suspended in a solution of 17 parts by weight of cetyl-mercaptan in 34 parts by weight of benzene. Then, while stirring at room-temperature, we introduce hydrogen chloride-gas into the mixture until the suspended paraformaldehyde has disappeared and until free mercaptan is no longer detectable in the solution. The benzene is then distilled off under reduced pressure and the formaldehyde-dicetayl-mercaptal is obtained as residue in the form of a wax-like mass.

Example 2

11 parts by weight of mono-chloro-acetal and 21 parts by weight of n-octyl-mercaptan are mixed, whereupon hydrogen chloride-gas is introduced until the reaction-component is completely converted. The thus obtained chloro-acetaldehyde-dioctyl-mercaptal, in oil-form, is now liberated from the hydrochloric acid by washing with water. The Cl atom present in this compound may be substituted by a $SO_3$ group, in which case we obtain a product of surface-active properties which is soluble in water.

Example 3

Into a mixture of 2 parts by weight of dodecyl-mercaptan, 1 part by weight of glucose and 10 parts by weight of alcohol, hydrogen chloride-gas in introduced, while stirring and cooling, until the mercaptan has completely disappeared. Then the reaction-mixture is poured into a large quantity of water, whereupon the amorphously separated reaction-product is filtered off and dried. The thus obtained glucose-didodecyl-mercaptal is applied as an excellent agent to emulsify in water or in aqueous solutions the most heterogeneous organic liquids, fats, oils and waxes otherwise insoluble in water.

Example 4

3 parts by weight of levulinic acid and 14 parts by weight of octadecyl-mercaptan are dissolved in 45 parts by weight of ether. To this solution, we admix half as much by volume of concentrated etheric hydrochloric acid and the mixture is then kept for one day at room temperature, whereupon the formed colourless crystal mass is sucked off. The resulting reaction product consisting of di-octadecyl-mercapto-valerianic acid is then recrystallized from alcohol. This product may be used per se or in the form of its esters or salts as a wax substitute.

Example 5

One hundred and fifty-one parts by weight of m-nitro-benzaldehyde and 573 parts by weight of octadecyl-mercaptan are dissolved at room temperature in 900 parts by weight of benzene. Hydrogen chloride gas is introduced into the mixture while maintaining the temperature at 20–25° C. by cooling with cold water until the mixture solidifies to a paste-like mass. After a short period of time, the excess liquid is drawn off and the reaction mass dried, whereupon 70% of the total amount of the developed m-nitro-benzaldehyde-dioctadecyl-mercaptal is obtained in the form of a white powder having a melting point of about 54–55° C. The remainder of the reaction product developed in the reactions is obtained from the benzene solution by evaporating the benzene. Ultimately, the reaction product is obtained in nearly a quantitative yield.

I claim:

As a new chemical compound the chloro-acetaldehyde-dioctyl-mercaptal.

ERIK SCHIRM.

---

Certificate of Correction

Patent No. 2,369,612. February 13, 1945.

ERIK SCHIRM

It is hereby certified that error appears in the printed specification of the above numbered patent requiring correction as follows: Page 2, first column, line 17, Example 2, for "$SO_3$ group" read $SO_3H$ group; and that the said Letters Patent should be read with this correction therein that the same may conform to the record of the case in the Patent Office.

Signed and sealed this 4th day of June, A. D. 1946.

[SEAL]

LESLIE FRAZER,
*First Assistant Commissioner of Patents.* ture until the suspended paraformaldehyde has disappeared and until free mercaptan is no longer detectable in the solution. The benzene is then distilled off under reduced pressure and the formaldehyde-dicetayl-mercaptal is obtained as residue in the form of a wax-like mass.

Example 2

11 parts by weight of mono-chloro-acetal and 21 parts by weight of n-octyl-mercaptan are mixed, whereupon hydrogen chloride-gas is introduced until the reaction-component is completely converted. The thus obtained chloro-acetaldehyde-dioctyl-mercaptal, in oil-form, is now liberated from the hydrochloric acid by washing with water. The Cl atom present in this compound may be substituted by a $SO_3$ group, in which case we obtain a product of surface-active properties which is soluble in water.

Example 3

Into a mixture of 2 parts by weight of dodecyl-mercaptan, 1 part by weight of glucose and 10 parts by weight of alcohol, hydrogen chloride-gas in introduced, while stirring and cooling, until the mercaptan has completely disappeared. Then the reaction-mixture is poured into a large quantity of water, whereupon the amorphously separated reaction-product is filtered off and dried. The thus obtained glucose-didodecyl-mercaptal is applied as an excellent agent to emulsify in water or in aqueous solutions the most heterogeneous organic liquids, fats, oils and waxes otherwise insoluble in water.

Example 4

3 parts by weight of levulinic acid and 14 parts by weight of octadecyl-mercaptan are dissolved in 45 parts by weight of ether. To this solution, we admix half as much by volume of concentrated etheric hydrochloric acid and the mixture is then kept for one day at room temperature, whereupon the formed colourless crystal mass is sucked off. The resulting reaction product consisting of di-octadecyl-mercapto-valerianic acid is then recrystallized from alcohol. This product may be used per se or in the form of its esters or salts as a wax substitute.

Example 5

One hundred and fifty-one parts by weight of m-nitro-benzaldehyde and 573 parts by weight of octadecyl-mercaptan are dissolved at room temperature in 900 parts by weight of benzene. Hydrogen chloride gas is introduced into the mixture while maintaining the temperature at 20–25° C. by cooling with cold water until the mixture solidifies to a paste-like mass. After a short period of time, the excess liquid is drawn off and the reaction mass dried, whereupon 70% of the total amount of the developed m-nitro-benzaldehyde-dioctadecyl-mercaptal is obtained in the form of a white powder having a melting point of about 54–55° C. The remainder of the reaction product developed in the reactions is obtained from the benzene solution by evaporating the benzene. Ultimately, the reaction product is obtained in nearly a quantitative yield.

I claim:

As a new chemical compound the chloro-acetaldehyde-dioctyl-mercaptal.

ERIK SCHIRM.

Certificate of Correction

Patent No. 2,369,612. February 13, 1945.

ERIK SCHIRM

It is hereby certified that error appears in the printed specification of the above numbered patent requiring correction as follows: Page 2, first column, line 17, Example 2, for "$SO_3$ group" read $SO_3H$ group; and that the said Letters Patent should be read with this correction therein that the same may conform to the record of the case in the Patent Office.

Signed and sealed this 4th day of June, A. D. 1946.

[SEAL]

LESLIE FRAZER,
*First Assistant Commissioner of Patents.*